UNITED STATES PATENT OFFICE.

EDWARD J. FUCHS, OF SCRANTON, PENNSYLVANIA.

GRIT FOOD FOR FOWLS.

No. 866,641.     Specification of Letters Patent.     Patented Sept. 24, 1907.

Application filed August 30, 1905. Serial No. 276,401.

*To all whom it may concern:*

Be it known that I, EDWARD J. FUCHS, a citizen of the United States, and a resident of Scranton, in the county of Lackawanna and State of Pennsylvania, have invented certain new and useful Improvements in Grit Food for Fowls, of which the following is a full, clear, and exact description.

My invention relates to improved grit-food for fowls. In making this grit food I proceed as follows: I take two thousand pounds of sand of good quality, one thousand pounds of bone phosphate of lime, preferably in the form of bone ash or ground phosphate rock, and five hundred pounds of a flux, preferably composed of three hundred fifty pounds of soda ash, with one hundred fifty pounds of pulverized air-slaked lime. These ingredients I admix together in the proportions stated and bake in an ordinary pot or tank furnace, such, for instance, as is employed in the melting of glass. A temperature of 2500 degrees to 3500 degrees Fahrenheit is adequate for this purpose. The material is now allowed to cool off; it is found to possess a hard brittle character and slag-like or somewhat vitrified appearance. It is exceedingly porous. The silica, the soda ash, the lime and the phosphates present in the material at the approximate 3000° F. temperature, react and form phospho-silicates of lime and soda in the approximate proportion of ninety per cent. of phospho-silicate of lime to ten per cent. of phospho-silicate of soda. It is next crushed in suitable grinding machinery, so as to produce either meal or grains of suitable size, the latter preferably of the size of a small pea. If desired, various metallic oxids or chemicals may be fused with the mixture for the purpose of coloring the product. The finished product contains approximately thirty per cent. of phosphate of lime, and seventy per cent. of silicate of soda and silicate of lime combined.

The product above described contains valuable nutritive elements suitable for fowls, and also contains elements necessary for the sustenance of hens engaged in laying eggs. It is largely insoluble in water, but, under the action of the powerful digestive fluids of the fowls, it is assimilated to considerable extent, and the part which is not thus assimilated, remains hard and glassy. To the extent, therefore, that that portion of the product which does not serve as a food and egg builder, necessarily serves as a grit, which, as is well known to poultry men, is necessary for the welfare of the fowls.

Having thus described my invention, I claim as new and desire to secure by Letters Patent:

1. A food grit for fowls containing phospho-silicates of lime and soda, substantially in the proportions specified, said grit food being of a somewhat vitreous, gritty and porous nature, and being broken into pieces of proper sizes to be eaten by fowls.

2. A grit food for fowls, containing phospho-silicates of lime and soda, substantially in the proportions specified, said grit food being a product of a somewhat vitreous, gritty and porous character.

3. A grit-food for fowls, containing phospho-silicates of lime and soda in the approximate proportion of ninety per cent. of phospho-silicate of lime to ten per cent. of phospho-silicate of soda, said grit-food being a product of a somewhat vitreous, gritty and porous character.

In testimony whereof I have signed my name to this specification in the presence of two subscribing witnesses.

EDWARD J. FUCHS.

Witnesses:
ANNA K. FUCHS,
E. L. KIESEL.